(12) United States Patent
Duran et al.

(10) Patent No.: US 6,796,529 B1
(45) Date of Patent: Sep. 28, 2004

(54) AIRCRAFT STRUT

(75) Inventors: John A. Duran, Glendora, CA (US); Edward Avetisian, Burbank, CA (US); William D. Lopez, Granada Hills, CA (US)

(73) Assignee: Avibank.Mfg., Inc., North Hollywood, CA (US)

( * ) Notice: Subject to any disclaimer, the term of this patent is extended or adjusted under 35 U.S.C. 154(b) by 0 days.

(21) Appl. No.: 10/615,205

(22) Filed: Jul. 8, 2003

(51) Int. Cl.[7] .............................. B64C 1/14; F16B 7/10
(52) U.S. Cl. ................................ 244/129.5; 244/118.1; 403/109.3; 403/109.8
(58) Field of Search ........................... 244/118.1, 129.1, 244/129.4, 129.5; 403/109.1, 109.3, 109.8

(56) References Cited

U.S. PATENT DOCUMENTS

| 3,763,666 | A | * | 10/1973 | Tibussek | ..................... 464/18 |
|---|---|---|---|---|---|
| 3,948,549 | A | | 4/1976 | Duran | |
| 5,007,762 | A | | 4/1991 | Duran | |
| 5,836,564 | A | | 11/1998 | Duran | |
| 5,983,455 | A | * | 11/1999 | Polzin et al. | ................. 16/429 |
| 6,520,192 | B1 | * | 2/2003 | Lo | ............................. 135/25.4 |

* cited by examiner

Primary Examiner—Robert P. Swiatek
(74) Attorney, Agent, or Firm—Louis J. Bovasso; Greenberg Traurig LLP (57) ABSTRACT

A strut for propping open the door of an aircraft including an outer tube connected at one end to the aircraft and a telescoping inner member connected to the aircraft door. The inner member is extended out of the outer tube when the door is fully opened and automatically locks in place. The strut can be unlocked by grasping a sleeve mounted on the outer tube, pulling it downwardly while rotating the same clockwise. The strut remains locked until the door is lifted upwardly until it stops thereby unlocking the strut. Lowering the door returns the strut to its stowed position with the inner member received within the outer tube.

11 Claims, 10 Drawing Sheets

AIRCRAFT STRUT

BACKGROUND OF THE INVENTION

1. Field of the Invention

The invention relates to aircraft struts; and, more particularly, to a strut for propping open an aircraft door that can be operated by a single person where two or more struts are used.

2. General Background and State of the Art

Telescoping rods or struts are well known in the aircraft art. Such struts are used, for example, to hold aircraft doors in a fully open position. In a conventional application, the aircraft door is raised to an open position with the struts automatically locking as the aircraft door reaches a fully open position. In current applications, the existing prior art struts, when unlocked, either release the locking element as they are activated or do not continuously support the load placed therein after the lock is released. Thus, there is a need for an aircraft strut that will be able to support the load placed thereon by the aircraft door after release of the locking mechanism. Such a release should have an intermediate locking position so that a single person can open or close an aircraft door supported by two struts or more.

INVENTION SUMMARY

It is an object of this invention to provide a strut for an aircraft door which allows a single person to operate the door.

It is a further object of this invention to provide a strut that automatically locks when the aircraft door is opened and reaches a fully open position.

It is still further an object of this invention to provide a strut that supports the load of the aircraft door after release of the locking mechanism (the intermediate lock position).

These and other objects are preferably accomplished by providing a strut that includes an outer tube adapted to be connected to the aircraft and a telescoping inner member connected to the aircraft door. The inner member is extended out of the outer tube when the door is fully opened and automatically locks in place. The strut can be unlocked by grasping a sleeve mounted on the outer tube and pulling it downwardly while rotating the same clockwise. The strut remains locked until the door is lifted upwardly until it stops, thereby unlocking the strut. Lowering the door returns the strut to its stowed position with the inner member received within the outer tube.

DETAILED DESCRIPTION OF THE PREFERRED EMBODIMENTS

Figure 1:
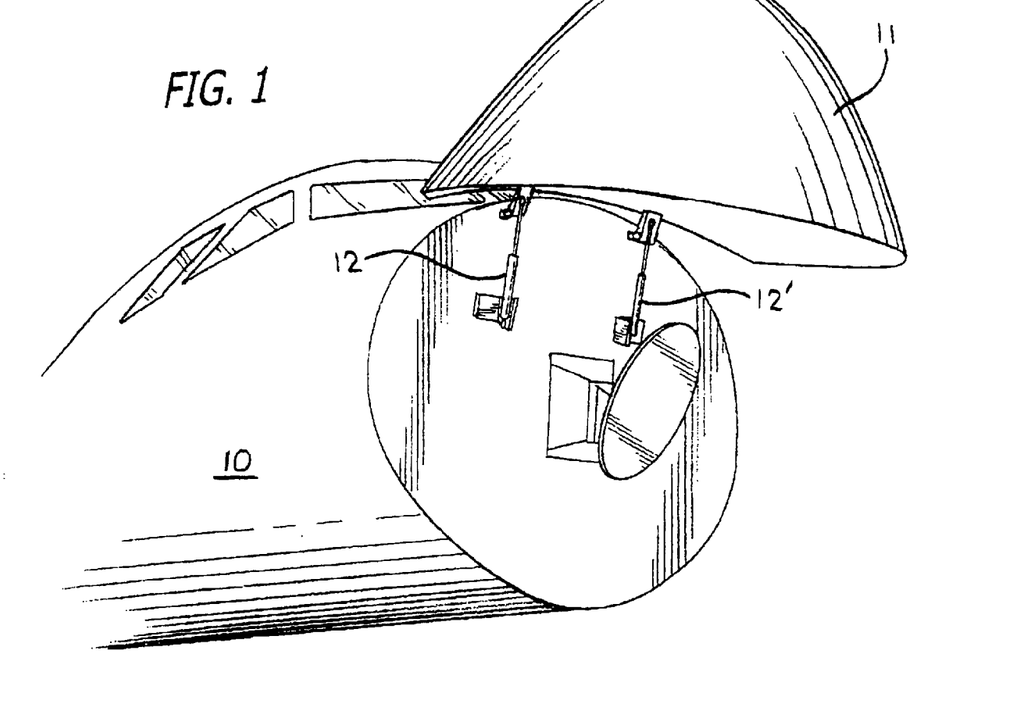
FIG. 1 is a perspective view of a portion of an aircraft showing the aircraft door in an open position.

Referring now to FIG. 1 of the drawing, a portion of an aircraft 10 is shown having door 11, supported in a fully open position by a pair of aircraft struts 12, 12'. Each strut 12 and 12' is identical and both extend and automatically lock to hold door 11 in the fully open position shown in FIG. 1.

Figure 2:
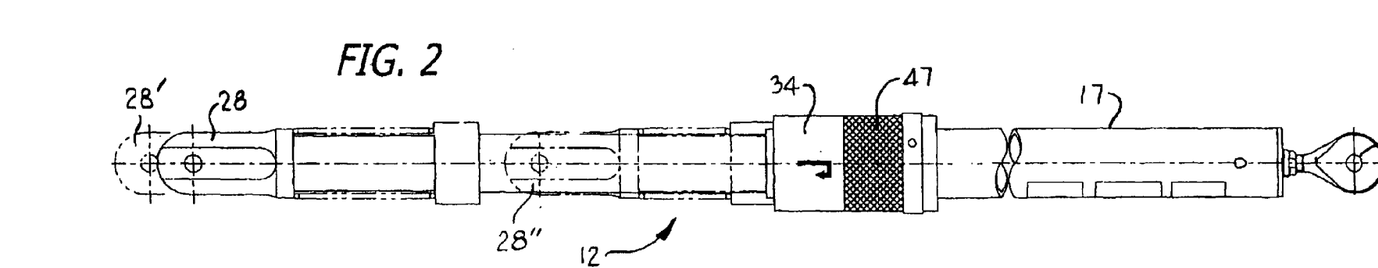
FIG. 2 is an elevational view of one of the struts of FIG. 1 illustrating operative positions thereof.

One of the struts, such as strut 12, is shown in FIG. 2. Strut 12 includes an eyelet 13 at one end having a hole 14 therethrough. Eyelet 13 has a threaded shaft 15 (FIG. 3) threadably received in a threaded hole 16 on collet 23 fastened by rivet 21 to generally cylindrical elongated outer tube 17. A self-locking nut 18 secures eyelet 13 to tube 17. A conventional ball locking pin 19, as is known in the art, is secured to tube 17 by a wire member 20 in any suitable manner, such as pin 21 extending through tube 17. Tube 17 is hollow on its interior having an inner hollow tube 22 reciprocal therein.

Figure 3:
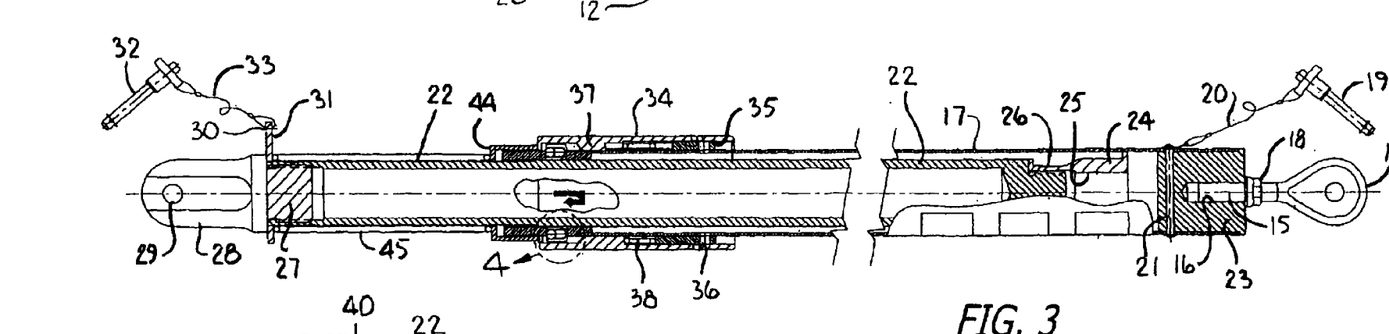
FIG. 3 is a cross-sectional view of the strut of FIG. 2.

Threaded hole 16 is formed in a collet 23 closing off one end of tube 17 and secured via pin 21 to tube 17.

A tube stop 24 is disposed inside of tube 17 having a first hollow sleeve portion 25 and a second threaded portion 26, of lesser thickness than portion 25, threadably receiving therein a reduced neck portion 26 of inner tube 22.

Tube 22 is closed off at its opposite end by an end fitting 27 threadably received in the open end of tube 22. End fitting 27 has a yoke portion 28 with an aperture 29 therethrough with a flange 31 mounted between yoke portion 28 and tube 22, flange 31 having a hole therethrough receiving tube 22 therein so that flange 31 is reciprocal along tube 22. Flange 31 has a hole 30 receiving a wire 33 connected to a conventional ball lock assembly 32, similar to ball lock assembly 19, therethrough.

A generally cylindrical sleeve 34 is mounted to the exterior of tube 17. A spacer sleeve 35 encircles tube 17, and is secured thereto via screw 36. Sleeve 34 reciprocates over spacer sleeve 35. Sleeve 34 has an inner enlarged portion 37 with a spring 38 encircling tube 17 abutting at one end against spacer sleeve 35 and at the other end against enlarged portion 37.

Figure 4:
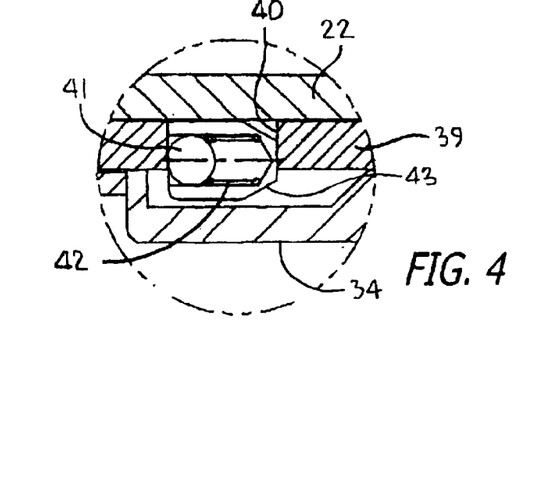
FIG. 4 is a detailed view of FIG. 3 taken along line 4 thereof.
Figure 5:
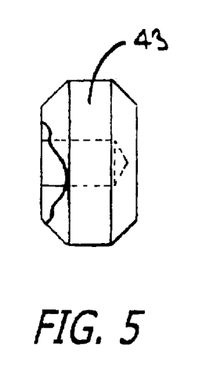
FIG. 5 is a detailed elevational view of one of the parts of the strut of FIG. 4 removed therefrom.

Outer tube 17 has an enlarged portion 39 (See FIG. 4) with four slots 40 therethrough equally spaced therearound. A puck 43 (see also FIG. 5) is mounted in each slot 40 and retained therein by sleeve 34 (FIG. 4). A ball 41 is mounted in each puck 43 biased by a spring 42 mounted therein.

A flange 44 (FIG. 3) is reciprocally mounted on inner tube 22 adapted to abut against sleeve 34. A spring 45 encircles tube 22 between flange 31 and flange 44. As seen in FIG. 2, sleeve 34 may be knurled, as at knurled portion 47, on its outer surface.

Figure 6:
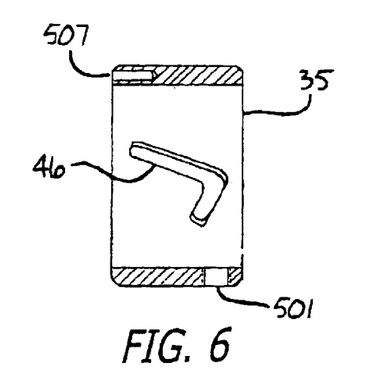
FIG. 6 is a detailed elevational view of the interior of the sleeve of the strut of FIG. 3 illustrating the slot therein.

Spacer sleeve 35 (FIG. 6) has a V-shaped slot 46 therethrough for reasons to be discussed below.

FIG. 2 illustrates the three positions of strut 12. The first position, shown in solid lines, is the fully extended and locked position. The dotted line position 28' of yoke portion 28 illustrates the maximum stroke required to release. The dotted line portion 28" of yoke portion 28 illustrates the reset position.

Figures 7, 8:
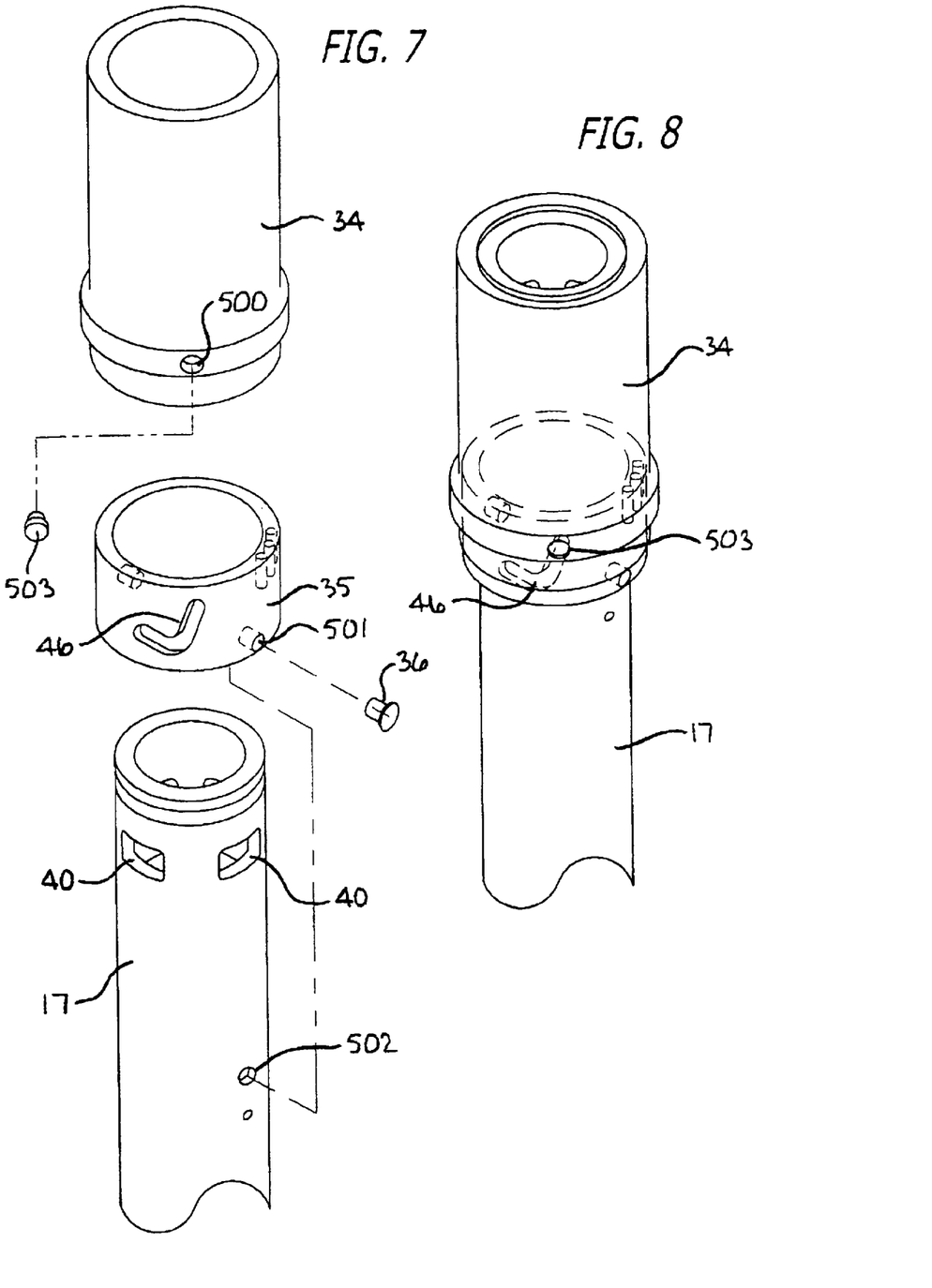
FIG. 7 is an exploded view of assembly of parts of the strut of FIGS. 1 to 6.
FIG. 8 is an assembled view of the parts of FIG. 7.

The assembly of parts and function of slot 46 will now be discussed with reference to FIG. 7. Sleeve 34 has a hole 500 (not visible in FIG. 3) therethrough at one end. Sleeve 34 fits over spacer sleeve 35. Spacer sleeve 35 has the V-shaped slot 46 therethrough and threaded hole 501. Sleeve 35 goes over tube 17 with hole 501 aligning with hole 502 in tube 17. Aforementioned screw 36 (FIG. 3) is screwed interaligned holes 501, 502. Tube 17 is now mounted over inner tube 22 (see FIG. 3 not shown in FIG. 7).

A pin is mounted in hole 500 and, when assembled as discussed, pin 503 rides in slot 46. This is shown in FIG. 8.

Figure 9:
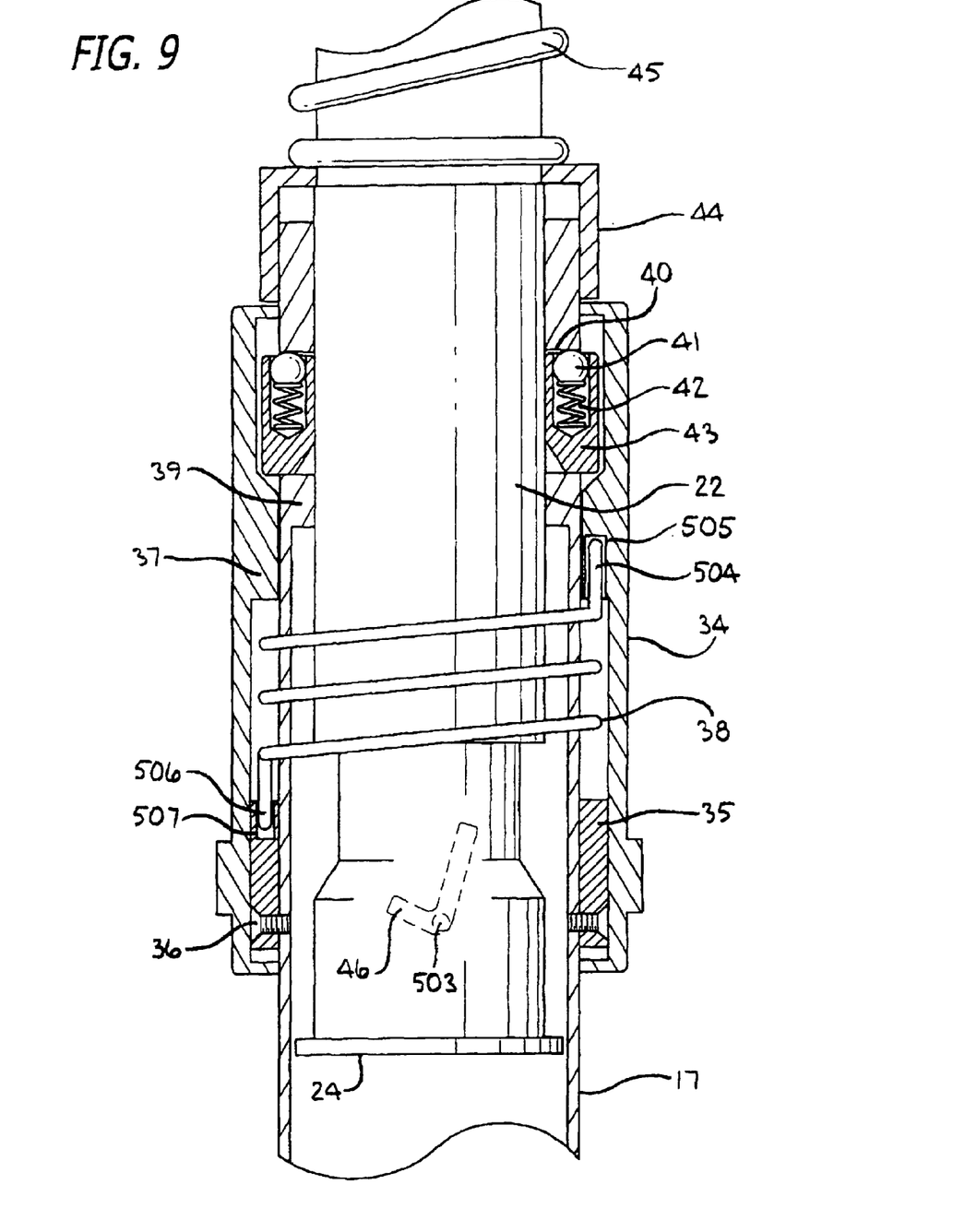
FIG. 9 is an elevational view, partly in section, of the assembled parts of FIG. 8 mounted to the tube 22.

Referring now to FIG. 9, spring 38 provides both lateral movement and rotational movement. As seen in FIG. 9, spring 38 has a first end 504 mounted in a hole 505 in enlarged portion 37 of sleeve 34. Spring 38 has its outer end 506 mounted in a hole 507 in spacer sleeve 35. Since ends 504 and 506 are secured in fixed position, spring 38 stores energy when it is rotated.

In FIG. 9, pin 503 is at rest in slot 46.

Figure 10:
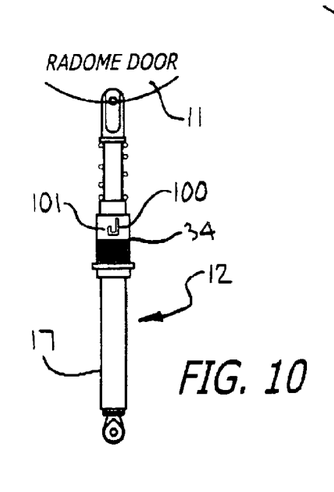
FIGS. 10 through 12 illustrate successive positions in the operation of one of the struts of the invention.

The operation of struts 12, 12' will now be described. As seen in FIG. 10, strut 12 is in the closed position and door 11 is closed. Indicia 100 has an arrow 101 at the top thereof facing door 11. Inner tube 22 is connected to door 11 and it is to be understood that outer tube 17 is connected to the aircraft (see FIG. 1) to which door 11 is connected.

Figure 11:
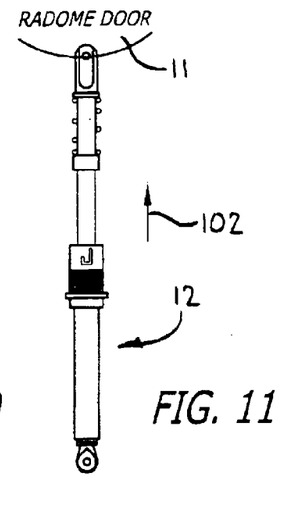
Figure 12:
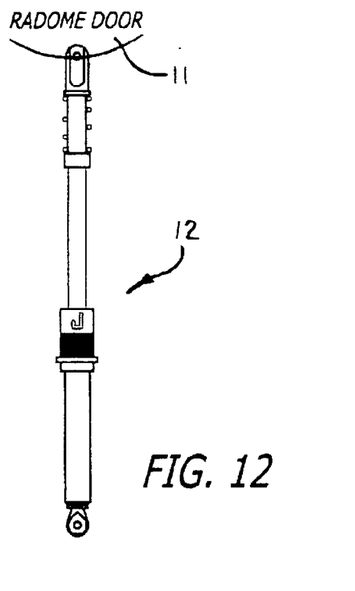

As seen in FIG. 11, opening of door 11 in direction of arrow 102 extends strut 12. As seen in FIG. 12, when the door 11 is in the fully open position, strut 12 automatically locks in place.

Figure 15:
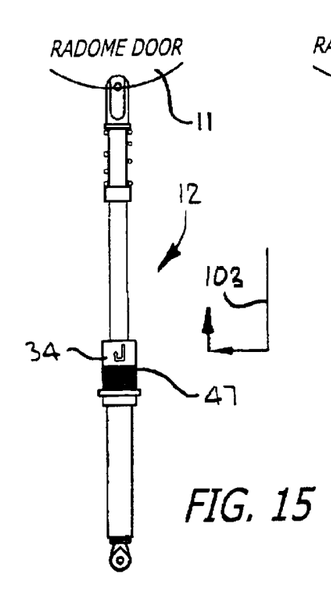
FIGS. 15 through 17 illustrate further successive portions in the operation of the strut of FIGS. 10 to 12.

Referring now in FIG. 15, when it is desired to unlock the strut, the operator grasps the knurled portion 47 of sleeve 34, pulls it downwardly and rotates sleeve 34 clockwise and upward as indicated by arrow 103. At this point, strut 12 is still locked. Door 11 (FIG. 16) is now lifted as indicated by arrow 104 upwardly until it stops. Strut 12 is now unlocked. Lowering door 11 in the direction of arrow 105 (FIG. 17) returns strut 12 to the stowed position.

Figure 13:
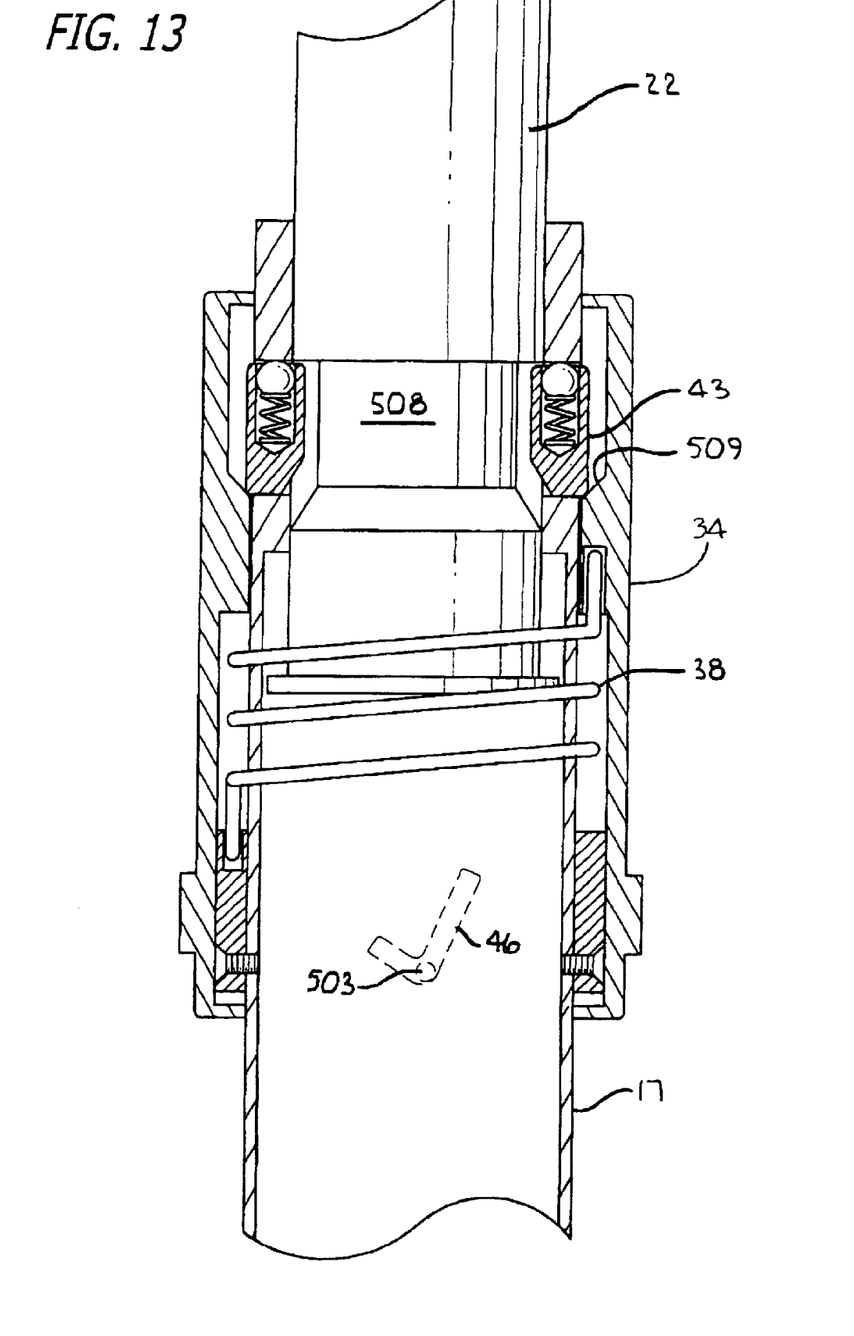
FIGS. 13 and 14 are views similar to FIG. 9 illustrating operation of the parts thereof.

As the door is initially lifted, tube 22 moves upwardly until it engages tube stop 24. As seen in FIG. 13, pucks 43 enter into the reduced area 508 of tube 22.

Figure 14:
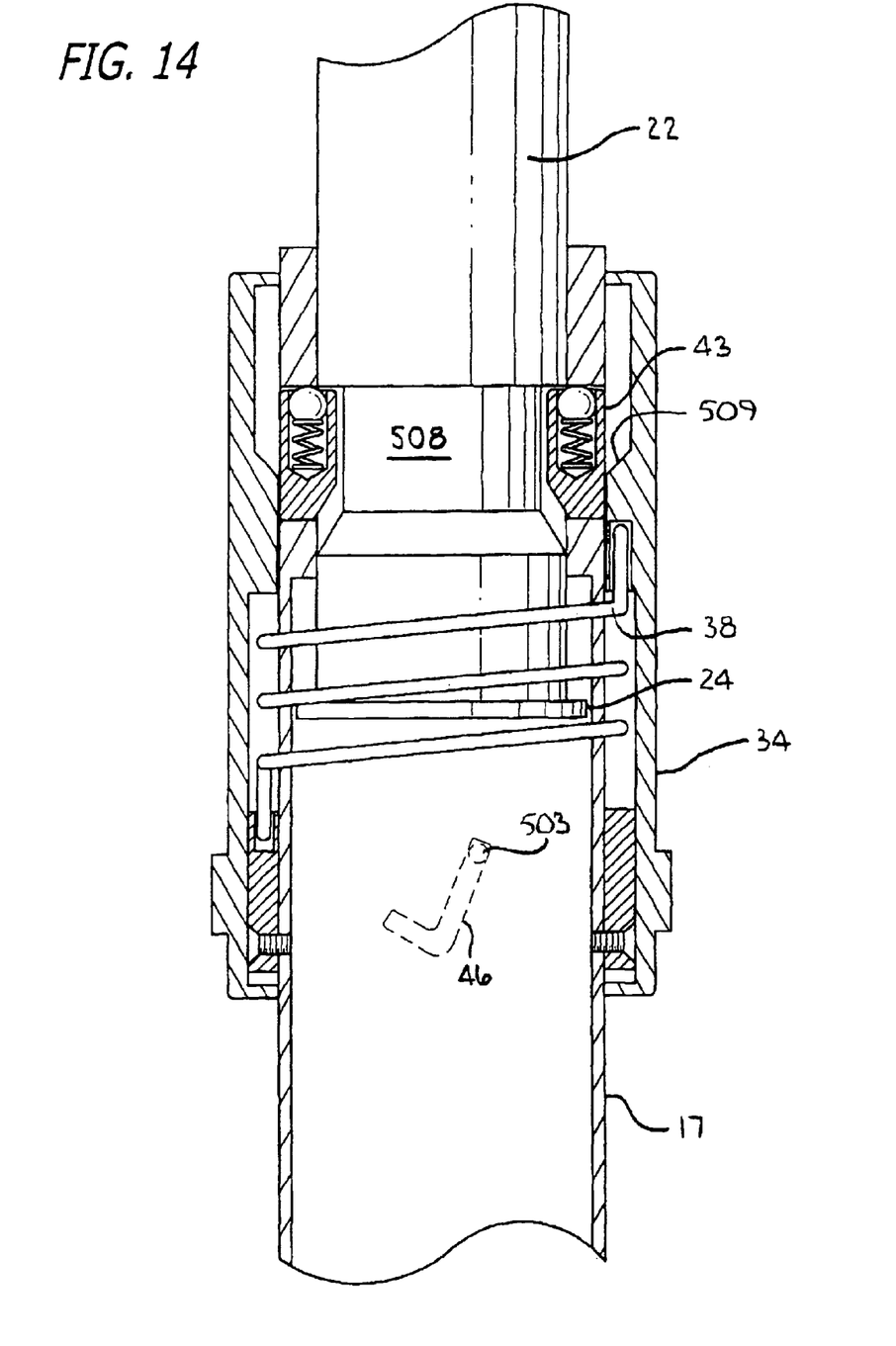

Referring now to FIG. 14, camming surface 509 on sleeve 34 pushes pucks 43 into the reduced area 508 of tube 22. In the position shown, as seen in FIG. 14, pucks 43 are completely within reduced area 508 and can't back out. Tube 22 cannot move down or up so the strut is completely locked. As seen in FIG. 14, pin 503 in 46 has moved all the way to the top of the longer leg of V-slot 46.

Figure 18:
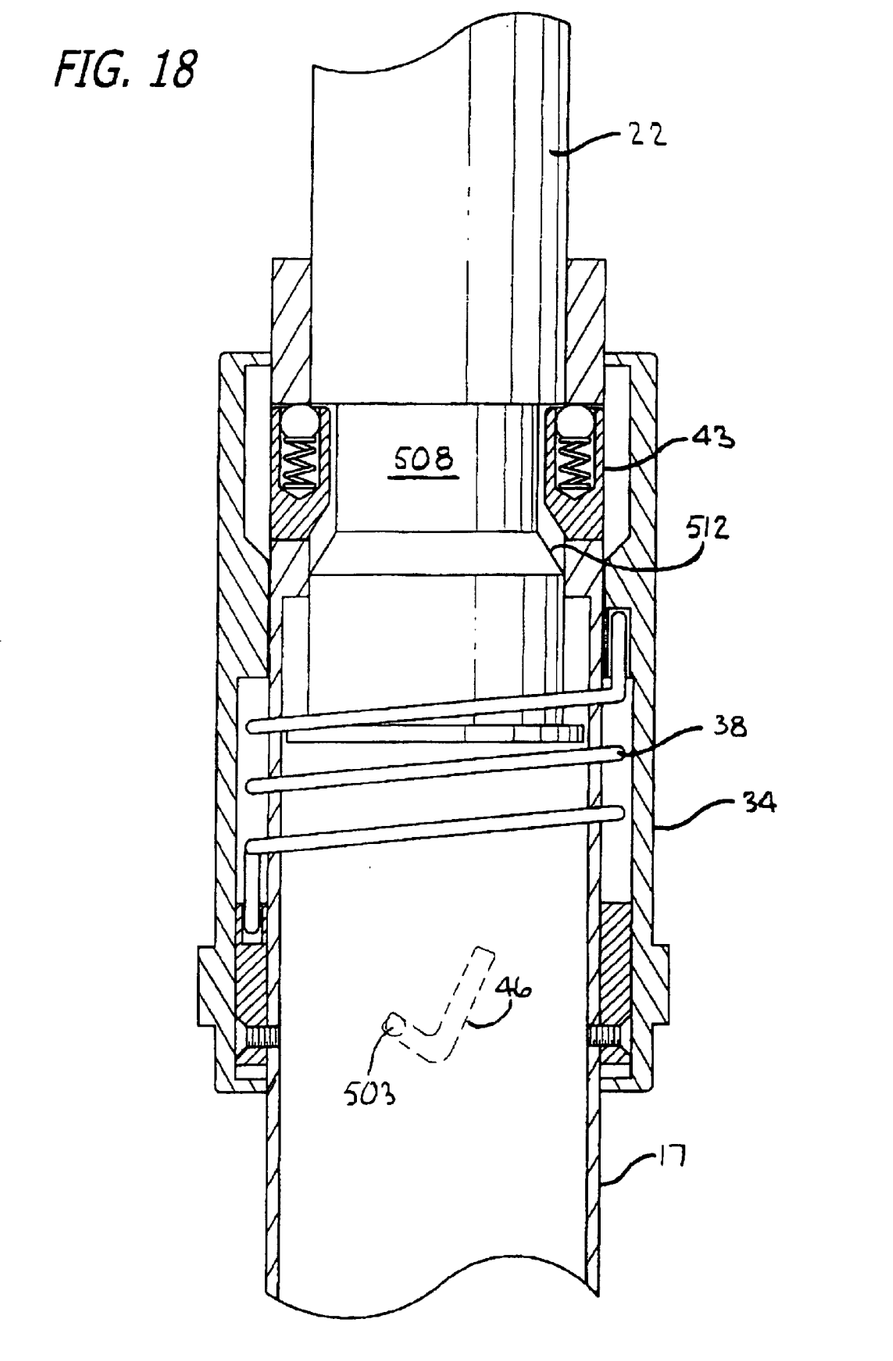
FIGS. 18 and 19 are views similar to FIGS. 13 and 14 illustrating further steps in operation of the parts thereof.

Referring now in FIG. 18, when collar 34 is pulled downwardly, pin 503 moves to the position shown in dotted lines in FIG. 18 within slot 46. At this time, the collar is locked.

Figure 16:
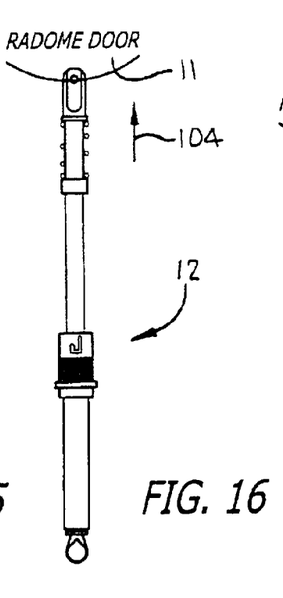
Figure 19:
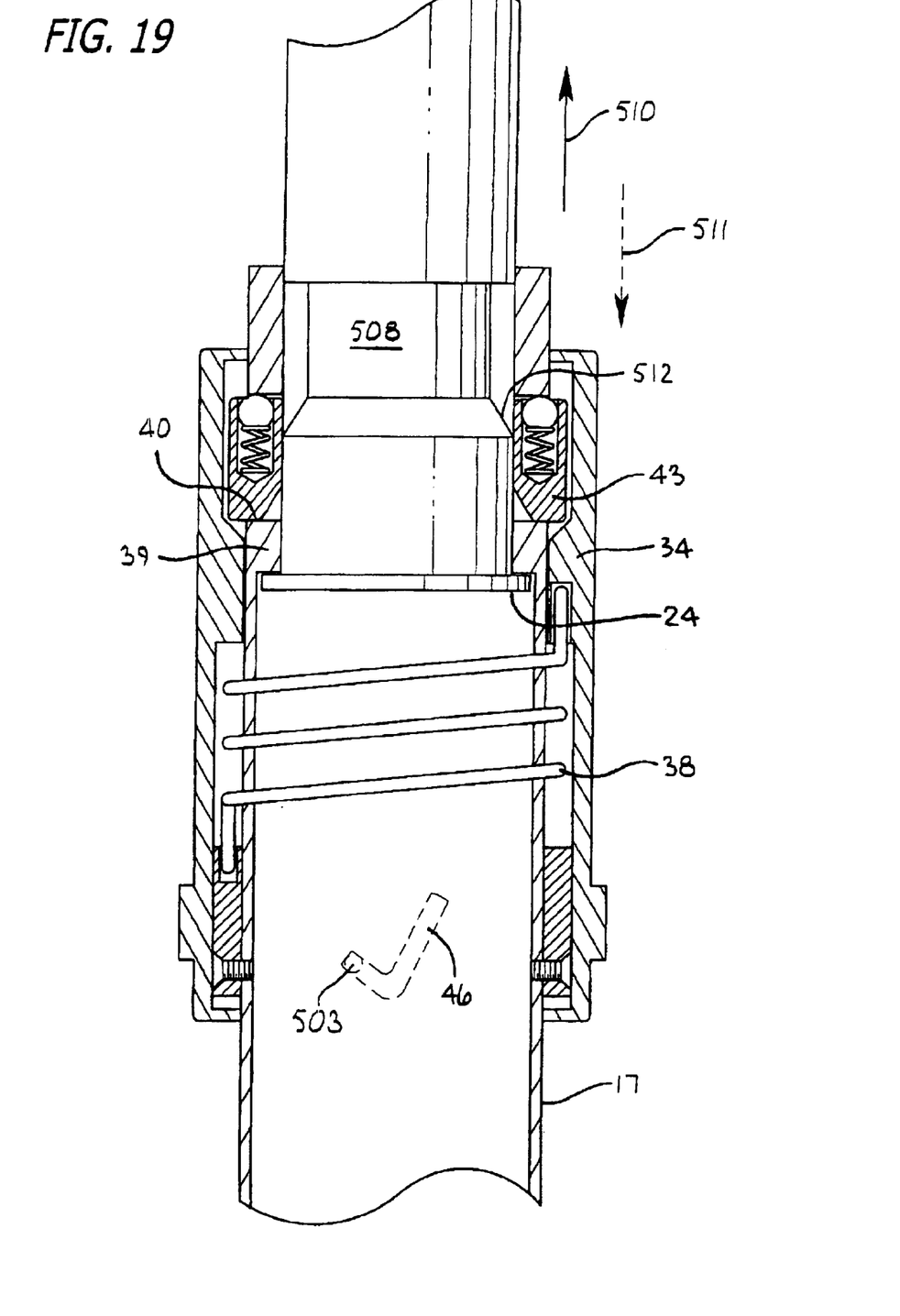

As seen in FIG. 19, in order to unlock pucks 43, as the door is pushed up further (FIG. 16), cam surface 512 of reduced portion 508 of tube 22 pushes against pucks 43 moving them back in the opening 40 in portion 39 of tube 17. The stop 24 abuts against portion 39 and the strut is completely unlocked (FIG. 16 position).

Collar 34 is still in locked position. In order to get collar 34 into the rest position, tube 22 is first moved up in the direction of arrow 510, then moved downwardly in the direction of arrow 511. This moves the parts back to the position shown in FIG. 9 wherein flange 44 comes down to the collar 34 and pushes the same downwardly so that pin 503 is released and coil spring 38 rotates collar 34 back to the rest position shown in FIG. 9.

As previously discussed, ball lock release means may be provided for quickly and easily securing struts 12, 12' to door 11 and aircraft 10. Any other suitable means may be used.

Figure 20:
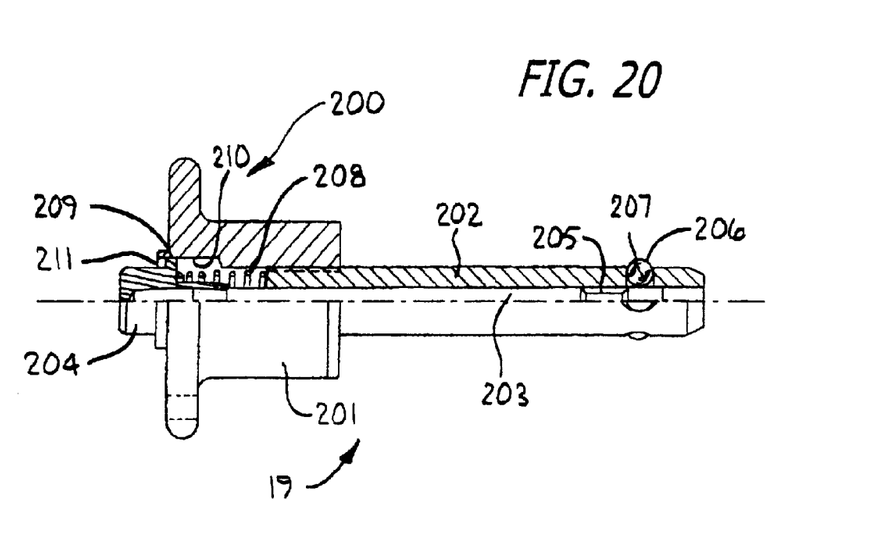
FIG. 20 is an elevational view, partly in cross-section, of a conventional ball locking pin of FIGS. 2 and 3 illustrating operation thereof.

Thus, as seen in FIG. 20, each ball release 19, 32 (FIG. 3), as ball release 19, may have a head 200, with a main cylindrical body portion 201, and an integral elongated cylindrical hollow shank portion 202, which may be threaded therein, lesser in diameter than portion 201. A spindle 203 is reciprocally mounted in shank portion 202 having a button portion 204 extending out of head 200 and a reduced neck portion 205 at its other end. Button portion 204 has a flange portion 209 reciprocal in a cavity 210 in head 201. A flange 211 at the terminal end of head 201 prevents button portion 204 from moving out of head 201. A spring 208 encircles spindle 203 and abuts at one end against shank portion 202 and at its other end against flange 209 of button 204 biasing spindle 203 to the position shown in FIG. 20, Shank portion 202 has a plurality of spaced holes, such as four, thereabout (see hole 207) and a ball 206 is mounted in each hole 207. Shank portion 202 is swaged about holes 207 to retain balls 206 therein and prevent them from exiting out of the holes 207 as is well known in the art. The balls 206 are of such diameter that, when spindle 203 is reciprocated, balls 206 enter reduced diameter portion 205 and do not extend out of holes 207. Thus, shank portion 202 can be inserted through a mounting hole, such as hole 29 in FIG. 3 by pressing on button portion 204, then locked therein by releasing button portion 204 which returns to the position shown in FIG. 20 due to the bias of spring 208. The balls 206 extend out of holes 207 and lock the release 32 in hole 29 until once again button portion 204 is activated.

Figure 17:
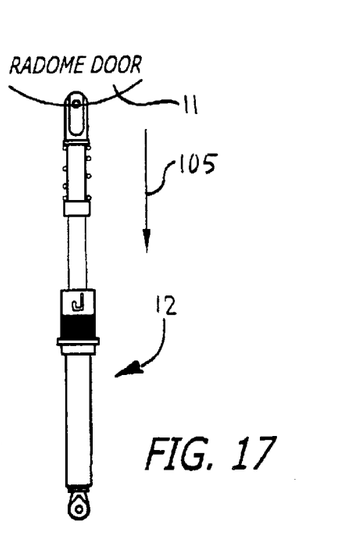

It can be seen that the locking mechanism is automatically actuated as the strut 12 goes from its unlocked to retracted position (from its FIG. 12 to its FIG. 17 position). The locking segments or pucks 43 are set to automatically lock as the strut 12 is in the extended position (FIG. 12). Prior to closing the door 11, the strut 12 must be put in the intermediate lock position by sliding and rotating the sleeve 34 as discussed hereinabove with respect to FIGS. 15 and 16. At this point, strut 12 is still able to carry the load placed thereon by door 11 and is prepared to close. Raising door 11 pushes the circular locking segments or pucks 43 centrifugally outwardly and the strut 12 is ready to collapse to its original state. As strut 12 collapses to its original state, the sleeve 34 is reset (FIG. 17) and the strut 12 is ready for another operational cycle.

It can be seen that there is disclosed a strut allowing one man operation in opening and closing aircraft doors. The strut disclosed herein can be manufactured more efficiently and made lighter in weight than known struts. This results in cost reduction in aircraft maintenance and improved safety during hard to reach areas. The locking and unlocking mechanism is relatively simple and can be remotely activated. The use of circular blocking rings specifically shaped to be actuated by inner tube 22 and outer sleeve 34 automatically allows the least amount of human effort to operate the strut.

Although a particular embodiment of the invention is disclosed, variations thereof may occur to an artisan and the scope of the invention should only be limited by the scope of the appended claims.

We claim:

1. A strut for propping open the door of an aircraft comprising:

an outer hollow tube having a telescoping inner member, a sleeve mounted on said outer tube; and locking means associated with said sleeve, said outer tube and said inner member for automatically locking said inner member when fully extended out of said outer tube and maintaining said inner member in a locked position when said sleeve is pulled away from said fully extended inner member and rotated until locked in place thereby allowing the said inner member to be further extended for forcing the locking means radially onwardly, thereby unlocking said inner member and permitting said inner member to return to a stowed position telescoped inside of said outer tube.

2. The strut of claim 1 wherein said locking means includes a spacer sleeve encircling said outer tube, said first mentioned sleeve mounted over said spacer sleeve, and having an inner enlarged portion with a spring abutting at one end against said spacer sleeve and a the other end against said enlarged portion, said outer tube having an enlarged diameter portion with a plurality of spaced slots therethrough, a spring-biased puck being mounted in each of said slots returned therein by said first mentioned sleeve, and a spring-biased ball mounted in each of said pucks.

3. The strut of claim 2 including a spring-biased flange reciprocally mounted on said inner member adapted to abut against said first mentioned sleeve.

4. The strut of claim 3 including a V-shaped slot cut out of said spacer sleeve having a pin mounted on said first mentioned sleeve disposed within said slot, the option of said pin within said slot coinciding with the position of said pucks.

5. The strut of claim 4 including indicia on said first mentioned sleeve coinciding with said slot.

6. A strut for propping open the radome door of an aircraft comprising:

an outer hollow tube connected at tone end to said aircraft having a telescoping inner member connected at tone end to said door;

a sleeve mounted on the said outer tube; and locking means associated with said sleeve, said outer tube and said inner member for automatically locking said inner member when fully extended out of said outer tube and maintaining said inner member in a locked position when said sleeve is pulled away from said fully extended inner member and rotated until said inner member is moved away from said sleeve thereby unlocking said inner member and permitting said inner member to return to a stowed position telescoped inside of said outer tube.

7. The strut of claim 6 wherein said locking means includes a spacer sleeve encircling said outer tube, said fist mentioned sleeve mounted over said spacer sleeve and having an inner enlarged portion with a spring abutting at one end against said spacer sleeve and at the other end against said enlarged portion, said outer tube having an enlarged diameter portion with a plurality of spaced slots therethrough, a spring-biased puck being mounted in each of said slots returned therein by said biased first mentioned sleeve, and a spring-biased ball mounted in each of said pucks.

8. The strut of claim 7 including a spring-biased flange reciprocally mounted on said inner member adapted to abut against said first mentioned sleeve.

9. The strut of claim 8 including a V-shaped slot cut out of said spacer sleeve having a pin mounted on said first mentioned sleeve disposed within said slot, the position of said pin within said slot coinciding with the position of said pucks.

10. The strut of claim 9 including indicia on said first mentioned sleeve coinciding with said slot.

11. The strut of claim 9 wherein a pair of said struts are provided connected to said door at spaced locations.

* * * * *